(12) United States Patent
Smiecinski

(10) Patent No.: US 9,062,174 B2
(45) Date of Patent: Jun. 23, 2015

(54) SINGLE LAYER FLEXIBLE FOAM INCLUDING POLYURETHANE GEL

(71) Applicant: BASF SE, Ludwigshafen (DE)

(72) Inventor: Theodore M. Smiecinski, Woodhaven, MI (US)

(73) Assignee: BASF SE, Ludwigshafen (DE)

( * ) Notice: Subject to any disclaimer, the term of this patent is extended or adjusted under 35 U.S.C. 154(b) by 115 days.

(21) Appl. No.: 13/573,583

(22) Filed: Sep. 26, 2012

(65) Prior Publication Data

US 2013/0079431 A1 Mar. 28, 2013

Related U.S. Application Data

(60) Provisional application No. 61/626,394, filed on Sep. 26, 2011.

(51) Int. Cl.
*C08G 18/06* (2006.01)
*C08G 18/08* (2006.01)
*C08J 9/35* (2006.01)
*C08G 18/48* (2006.01)
*C08G 18/66* (2006.01)
*C08G 18/76* (2006.01)
*C08G 18/20* (2006.01)
*C08L 75/08* (2006.01)
*C08G 101/00* (2006.01)

(52) U.S. Cl.
CPC . *C08J 9/35* (2013.01); *C08G 18/06* (2013.01); *C08G 18/0838* (2013.01); *C08J 2205/02* (2013.01); *C08J 2375/04* (2013.01); *C08J 2475/04* (2013.01); *C08G 2101/0008* (2013.01); *C08G 18/4829* (2013.01); *C08G 18/4833* (2013.01); *C08G 18/4841* (2013.01); *C08G 18/6688* (2013.01); *C08G 18/7621* (2013.01); *C08G 18/7664* (2013.01); *C08G 18/0871* (2013.01); *C08G 18/2063* (2013.01); *C08G 18/4816* (2013.01); *C08L 75/08* (2013.01); *C08G 2101/0083* (2013.01)

(58) Field of Classification Search
CPC ....... C08G 18/06; C08G 18/0838; C08J 9/35; C08J 2205/02; C08J 2205/06
USPC ............................................ 521/99, 155, 170
See application file for complete search history.

(56) References Cited

U.S. PATENT DOCUMENTS

| | | | | |
|---|---|---|---|---|
| 4,404,296 | A * | 9/1983 | Schapel | 523/105 |
| 4,456,642 | A * | 6/1984 | Burgdorfer et al. | 428/68 |
| 5,362,834 | A * | 11/1994 | Schapel et al. | 528/58 |
| 7,073,277 | B2 | 7/2006 | Erb et al. | |
| 7,439,062 | B2 | 10/2008 | Bhatt et al. | |
| 2004/0102573 | A1 | 5/2004 | Stender et al. | |
| 2009/0227695 | A1* | 9/2009 | Burdeniuc et al. | 521/113 |
| 2011/0311802 | A1* | 12/2011 | Cho et al. | 428/316.6 |
| 2012/0007012 | A1* | 1/2012 | Fricke et al. | 252/62 |
| 2012/0070606 | A1* | 3/2012 | Villata | 428/71 |

FOREIGN PATENT DOCUMENTS

WO WO-2011069928 A2 * 6/2011

* cited by examiner

*Primary Examiner* — Melissa Rioja
(74) *Attorney, Agent, or Firm* — Howard & Howard Attorneys PLLC

(57) ABSTRACT

A single layer flexible foam includes the reaction product of an (A) isocyanate component and a (B) isocyanate-reactive component. The isocyanate component and the isocyanate-reactive component react in the presence of a (C) polyurethane gel. The polyurethane gel has a viscosity of from about 3,000 to about 12,000 cps at 25° C. and includes the reaction product of a polyol component and a second isocyanate component which react at an isocyanate index of from about 10 to about 70. The flexible foam also includes a plurality of agglomerated gel substrates that are formed from the polyurethane gel and that are dispersed in the flexible foam. The flexible foam is formed using a method including the steps of providing (A), providing (B), providing (C), and combining (C) with (A) and (B), such that (A) and (B) react in the presence of (C) to form the flexible foam.

22 Claims, 4 Drawing Sheets

SINGLE LAYER FLEXIBLE FOAM INCLUDING POLYURETHANE GEL

CROSS-REFERENCE TO RELATED APPLICATION

This application claims the benefit of U.S. Provisional Application No. 61/626,394, filed on Sep. 26, 2011, the disclosure of which is incorporated by reference in its entirety.

FIELD OF THE DISCLOSURE

The present disclosure generally relates to a single layer flexible foam that includes a polyurethane gel. More specifically, the single layer flexible foam includes a plurality of agglomerated gel substrates that are formed from the polyurethane gel and that are dispersed in the flexible foam.

DESCRIPTION OF THE RELATED ART

Certain foams, such as viscoelastic memory foams, include layers of gel, flakes, and/or particles that are utilized in an effort to increase tactile properties such as firmness, support, resiliency, and compression resistance. However, such foams can be difficult to manufacture. For example, if such foams are produced as slabstock foams, it can be difficult to cut such foams into pieces. It is also difficult to form such foams using cost- and time-effective methods. Moreover, it is difficult to incorporate the layers of gel, flakes, and/or particles into the foam without disrupting the foaming mass (thereby compromising structural integrity) and without forming a product that includes an undesirable single mass of the gel, flakes, and/or particles, e.g. at the bottom of the foam. Accordingly, there remains an opportunity to develop an improved foam.

SUMMARY OF THE DISCLOSURE AND ADVANTAGES

The instant disclosure provides a single layer flexible foam. The single layer flexible foam typically includes the reaction product of an isocyanate component and an isocyanate-reactive component. The isocyanate component and the isocyanate-reactive component react in the presence of a polyurethane gel. The polyurethane gel has a viscosity of from about 3,000 to about 12,000 cps at 25° C. The polyurethane gel also includes the reaction product of a polyol component and a second isocyanate component. The polyol component and the second isocyanate component react at an isocyanate index of from about 10 to about 70. The single layer flexible foam also includes a plurality of agglomerated gel substrates that are formed from the polyurethane gel and that are dispersed in the single layer flexible foam. This disclosure also provides a method of forming the single layer flexible foam. The method includes the steps of providing the (A) isocyanate component, providing the (B) isocyanate-reactive component, providing the (C) polyurethane gel, and combining the (C) polyurethane gel with (A) and (B) such that (A) and (B) react in the presence of (C) to form the single layer flexible foam.

The polyurethane gel allows the single layer flexible foam to maintain excellent physical, fatigue, and flame retardant properties while simultaneously improving compression sets and decreasing formation of pressure points when in use. The polyurethane gel also allows the single layer flexible foam to be produced in a time and cost efficient manner, typically without disruption of the foaming mass.

BRIEF DESCRIPTION OF THE DRAWINGS

Other advantages of the present disclosure will be readily appreciated, as the present disclosure becomes better understood by reference to the following detailed description when considered in connection with the accompanying drawings wherein.

DETAILED DESCRIPTION OF THE DISCLOSURE

The instant disclosure provides a single layer flexible foam and a method of forming the single layer flexible foam. The terminology "single layer flexible foam" describes that the flexible foam is (e.g. consists of or has) a single layer. Said differently, the single layer flexible foam is typically an integral mass and is not segmented into discrete layers. In other words, the single layer flexible foam is free from having two or more discrete (e.g. identifiable) layers. The single layer flexible foam typically has a top, bottom, and one or more sides, wherein the top defines a first outermost surface, the bottom defines a second outermost surface, and the one or more sides each defines third and/or additional outermost surfaces.

The single layer flexible foam is not particularly limited and may be further defined as a viscoelastic single layer flexible foam, a traditional single layer flexible foam, a high resilience single layer flexible foam, a closed cell single layer flexible foam, an open cell single layer flexible foam, a molded single layer flexible foam, a slabstock single layer flexible foam, and/or combinations of the above. Similarly, the single layer flexible foam may be further defined as a polyurethane single layer flexible foam, a polyurea single layer flexible foam, a polymer single layer flexible foam, a single layer flexible foam rubber, and the like. In one embodiment, the single layer flexible foam is further defined as a polyurethane single layer flexible foam. In another embodiment, the single layer flexible foam is further defined as a polyurea single layer flexible foam. The single layer flexible foam may be formed/provided as a slabstock foam, a bun, etc. Various suitable but non-limiting generic examples of single layer flexible foams include Pluracel® VE and Pluracel® HR, both commercially available from BASF Corporation.

The terminology "flexible" foam is understood by those in the art and typically excludes foams that are understood to be rigid foams. For example, the flexible foam of this invention may have particular physical properties and/or distinguishing characteristics measured according to ASTM, ISO, and/or BIFMA standards (or any other standards recognized in the art). Non-limiting examples of various physical properties that may be measured and/or distinguishing include density, support factor (compression modulus), air flow, ball rebound, compression modulus, compression set, durability, dynamic fatigue, flex fatigue, hysteresis, indentation force deflection (IFD), recovery, resilience, static fatigue, surface firmness, tear strength, tensile strength, and/or total vertical motion (TVM). The flexible foam of this invention may have some of the aforementioned physical properties and not others. Similarly, in various embodiments, the flexible foam of this invention may be understood or distinguished by those of skill in the art based on measurements of one or more of the aforementioned physical properties.

Figure 3:
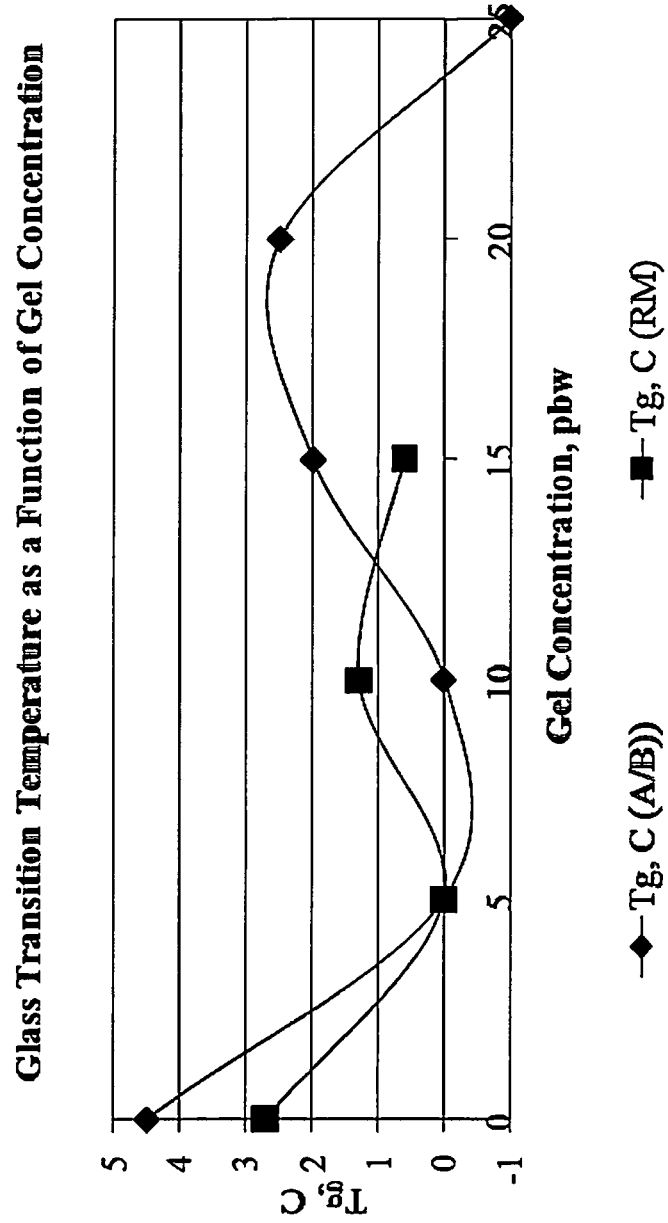
FIG. 3 is a line graph of glass transition temperatures of two identical single layer flexible foams each including a different polyurethane gel. The A/B gel is prepared with a second isocyanate component and a polyol component in a two component system mixed together in an appropriate ratio as understood by those of skill in the art. The RM gel is prepared with a raw materials recipe that includes the same second isocyanate component and polyol component as the A/B gel, as also understood by those of skill in the art. However, in the RM gel, the second isocyanate component and the polyol component are blended together in one-shot. The glass transition temperatures are set forth as a function of gel concentration in the single layer flexible foams in parts by weight.

The single layer flexible foam is not particularly limited relative to physical properties. In various embodiments, the single layer flexible foam has a glass transition temperature ($T_g$) of less than 30, 25, 20, 15, 10, 9, 8, 7, 6, 5, 4, 3, 2, 1.5, or 1, °C., for example, in FIG. 3. Alternatively, the single layer flexible foam may be described as having a glass transition temperature between any one or more values described above. It is also contemplated that the single layer flexible foam may have one or more physical properties as described in one or more Tables of the Examples and/or described above ±1, 2, 3, 4, 5, 10, 15, 20+%, etc. However, the physical properties set forth in the one or more Tables of the Examples are not required and are not intended to limit this disclosure.

The single layer flexible foam typically is, includes, consists essentially of, or consists of, the reaction product of (A) an isocyanate component and (B) an isocyanate-reactive component that are reacted in the presence of (C) a polyurethane gel. The terminology "consists essentially of" describes an embodiment wherein the single layer flexible foam is free of polymers that are not formed by the reaction of (A) and (B) in the presence of (C). Each of (A), (B), and (C) are described in greater detail below.

It is contemplated that, in other embodiments, the single layer flexible foam may be, include, consist essentially of, or consist of, the reaction product of one or more organic monomers, polymers, pre-polymers, etc., as are known in the art, to form one or more of the aforementioned types of foams described above, e.g. polyurea foam, polymer foams, flexible foam rubbers, etc. These various monomers, polymers, pre-polymers, etc. are not described herein for the sake of brevity, but are nonetheless contemplated for use and may be selected by one of skill in the art. In these embodiments, the one or more organic monomers, polymers, pre-polymers, etc. typically react in the presence of the (C) polyurethane gel. The terminology "consists essentially of" describes an embodiment wherein the single layer flexible foam is free of polymers that are not formed by the reaction of one or more of the organic monomers, polymers, pre-polymers, etc. above.

(A) Isocyanate Component:

The (A) isocyanate component may be, include, consist essentially of, or consist of, a single isocyanate or a combination of two or more isocyanates. Any of the isocyanates may be further defined as traditional isocyanates, polyisocyanates, biurets of isocyanates and polyisocyanates, isocyanurates of isocyanates and polyisocyanates, and combinations thereof. In one embodiment, the (A) isocyanate component is, includes, consists essentially of, or consists of, an n-functional isocyanate. In this embodiment, n is a number typically from 2 to 8, from 2 to 7, from 2 to 6, from 2 to 5, from 2 to 4, from 2 to 3, from 3 to 8, from 3 to 7, from 3 to 6, from 3 to 5, from 3 to 4, from 4 to 8, from 4 to 7, from 4 to 6, from 4 to 5, from 5 to 8, from 5 to 7, from 5 to 6, from 6 to 8, from 6 to 7, or from 7 to 8. It is to be understood that n may be an integer or may have intermediate values from 2 to 8 within any of the aforementioned ranges. The (A) isocyanate component may alternatively be, include, consist essentially of, or consist of, an isocyanate chosen from the group of aromatic isocyanates, aliphatic isocyanates, and combinations thereof. In one embodiment, the (A) isocyanate component is, includes, consists essentially of, or consists of, an aliphatic isocyanate. The (A) isocyanate component may also be, include, consist essentially of, or consist of, a modified multivalent aliphatic isocyanate, i.e., a product which is obtained through chemical reactions of aliphatic diisocyanates and/or aliphatic polyisocyanates. The (A) isocyanate component may also be, include, consist essentially of, or consist of, or be formed from, ureas, biurets, allophanates, carbodiimides, uretonimines, isocyanurates, urethane groups, dimers, trimers, and combinations thereof. The (A) isocyanate component may also be, include, consist essentially of, or consist of, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the (A) isocyanate component may be, include, consist essentially of, or consist of, an aromatic isocyanate. The aromatic isocyanate may correspond to the formula R'(NCO)$_z$ wherein R' is aromatic and z is an integer that corresponds to the valence of R'. Typically, z is at least two. The (A) isocyanate component may be, include, consist essentially of, or consist of, but is not limited to, the tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may be, include, consist essentially of, or consist of, a triisocyanate product of m-TMXDI and 1,1,1-trimethylolpropane, a reaction product of toluene diisocyanate and 1,1,1-trimethyolpropane, and combinations thereof.

In one embodiment, the (A) isocyanate component is further defined as being, including, consisting essentially of, or consisting of, a conventional aliphatic, cycloaliphatic, araliphatic and aromatic isocyanate. In other embodiments, the (A) isocyanate component is, includes, consists essentially of, or consists of, an isocyanate, chosen from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. In other embodiments, the (A) isocyanate component is, includes, consists essentially of, or consists of, an emulsifiable MDI (eMDI). Examples of other suitable isocyanates may be, include, consist essentially of, or consist of, but are not limited to, toluene diisocyanates (TDIs), hexamethylene diisocyanates (HDIs), isophorone diisocyanates (IPDIs), naphthalene diisocyanates (NDIs), and combinations thereof.

In certain embodiments, the (A) isocyanate component is, includes, consists essentially of, or consists of, an isocyanate-terminated prepolymer. The isocyanate-terminated prepolymer is typically a reaction product of an isocyanate and a polyol and/or a polyamine. The (A) isocyanate component may alternatively be, include, consist essentially of, or consist of, any type of isocyanate understood by those skilled in the polyurethane or polyurea arts, such as one of the polyisocyanates described and exemplified above. Specific non-limiting examples of suitable isocyanates are commercially available from BASF Corporation of Florham Park, N.J., under the trademark LUPRANATE®, such as LUPRANATE® M, LUPRANATE® MI, LUPRANATE® MM103, LUPRANATE® M20SB, LUPRANATE® M20HB, and LUPRANATE® M20FB, LUPRANATE® 280, and LUPRANATE® T-80 TDI isocyanates. It is to be appreciated that the (A) isocyanate component may be, include, consist essentially of, or consist of, any combination of the aforementioned isocyanates and/or isocyanate-terminated prepolymers. The (A) isocyanate component may be described as having any % NCO content and any viscosity.

The (A) isocyanate component may also react with the (B) isocyanate-reactive component in any amount, as determined by one skilled in the art. The (A) isocyanate component and the (B) isocyanate-reactive component are typically reacted at an isocyanate index from 30 to 150, from 40 to 130, from 50 to 120, from 60 to 110, from 70 to 100, from 80 to 90, from 70 to 90, from 75 to 85, from 85 to 95, from 80 to 90, or from 75 to 95. The terminology "consist essentially of", used in the paragraphs above, typically describes that the (A) isocyanate component may be free of polymers, e.g. non-isocyanate polymers, free of polyols, etc.

(B) Isocyanate-Reactive Component:

The (B) isocyanate-reactive component is also not particularly limited and may be further defined as, being, including, consisting essentially of, or consisting of, a polyol, an amine, an alcohol, or any other component known in the art to react with the (A) isocyanate component to form a single layer flexible foam. In one embodiment, the (B) isocyanate-reactive component is further defined as a polyol. In another embodiment, the (B) isocyanate-reactive component is further defined as an amine. The (B) isocyanate-reactive component may be formed using any method known in the art including, but not limited to, DMC catalysis.

The polyol and/or amine is also not particularly limited and may be formed from any initiator and may have any functionality. In various embodiments, the polyol and/or amine is formed from a 2, 3, 4, 5, 6, 7, or 8 functional initiator. Various non-limiting examples of suitable initiators include a plurality of active hydrogen atoms, and are, include, consist essentially of, or consist of, water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof. In one embodiment, the polyol is further defined as a triol and may be formed from initiators such as, but not limited to, glycerin, trimethylolpropane, and the like. In other embodiments, the polyol may be further defined as having a hydroxyl number of from 20 to 200, from 25 to 190, from 30 to 180, from 40 to 170, from 50 to 160, from 60 to 150, from 70 to 140, from 80 to 130, from 90 to 120, or from 100 to 110, mg KOH/g.

In other embodiments, the (B) isocyanate-reactive component is further defined as being, including, consisting essentially of, or consisting of, a polyester polyol, a polyether polyol, polyether/ester polyols, or combinations thereof. The polyol may be chosen from the group of, but is not limited to, aliphatic polyols, cycloaliphatic polyols, aromatic polyols, heterocyclic polyols, graft polyols, and combinations thereof. More specific examples of suitable polyols are chosen from the group of, but are not limited to, propylene glycols, sucrose-initiated polyols, sucrose/glycerine-initiated polyols, trimethylolpropane-initiated polyols, biopolyols, and combinations thereof.

Suitable polyether polyols may be, include, consist essentially of, or consist of, but are not limited to, products obtained by the polymerization of a cyclic oxide, for example ethylene oxide (EO), propylene oxide (PO), butylene oxide (BO), or tetrahydrofuran in the presence of one or more initiators. Suitable initiators include, but are not limited to, those described above.

Other suitable polyether polyols may be, include, consist essentially of, or consist of, polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols may be, include, consist essentially of, or consist of, but are not limited to, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramide polyols may be obtained by the inclusion of amino-alcohols such as ethanolamine in polyesterification mixtures. Suitable polythioether polyols may be, include, consist essentially of, or consist of, products obtained by condensing thiodiglycol either alone, or with other glycols, alkylene oxides, dicarboxylic acids, formaldehyde, amino-alcohols or amino-carboxylic acids. Suitable polycarbonate polyols include or are products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include or are those prepared by reacting glycols such as diethylene glycol, triethylene glycol or hexanediol with formaldehyde. Other suitable polyacetal polyols may also be prepared by polymerizing cyclic acetals. Suitable polyolefin polyols may be, include, consist essentially of, or consist of, hydroxy-terminated butadiene homo- and copolymers and suitable polysiloxane polyols include polydimethylsiloxane diols and triols.

In certain embodiments, the polyol is further defined as a natural oil polyol (NOP). In these embodiments, the polyol is not a petroleum-based polyol, i.e., a polyol derived from petroleum products and/or petroleum by-products. The NOP is typically derived from a natural oil understood in the art, and is most typically derived from a vegetable or nut oil. Examples of suitable natural oils may be, include, consist essentially of, or consist of, but are not limited to, castor oil, and NOPs derived from soybean oil, rapeseed oil, coconut oil, peanut oil, canola oil, etc. Employing such natural oils can be useful for reducing environmental footprints. In the aforementioned paragraphs, the terminology "consisting essentially of" typically describes that the (B) isocyanate-reactive component and/or initiators, etc. are free of additional monomers or polymers that would affect their reactivity with (A).

As first described above the (A) isocyanate component and the (B) isocyanate-reactive component typically react to form the single layer flexible foam in the presence of (C) the polyurethane gel. (A) and (B) may react by any know mechanism. Most typically, (A) and (B) react in a polyurethane and/or polyurea forming reaction. However, (A) and (B) may react by any other mechanism, e.g. isocyanate reactive mechanism, known in the art.

(C) Polyurethane Gel

Referring now to the (C) polyurethane gel, this gel is typically the reaction product of (1) a polyol component and (2) a second isocyanate component. In other embodiments, the (C) polyurethane gel may be, include, consist essentially of, or consist of, the reaction product of (1) and (2). The terminology "consists essentially of" typically describes that (C) is free of reaction products of other monomers and/or polymers.

The (1) polyol component may be the same or different from the (B) isocyanate-reactive component described above. Similarly, the (2) second isocyanate component may be the same or different from the (A) (first) isocyanate component described above. However, neither the (1) polyol component nor the (2) second isocyanate component is particularly limited and may be any known in the art. In one embodiment, the (1) polyol component is or includes Pluracol® 4156, Elastopan® S40650R, and/or Elastopan® S40657R each commercially available from BASF Corporation. In another embodiment, the (2) second isocyanate component is or includes Lupranate® 280, Elastopan® S40641T isocyanate, and/or Elastopan® S40642T isocyanate, also each commercially available from BASF Corporation.

The (1) polyol component and the (2) second isocyanate component are typically reacted at an isocyanate index of from about 10 to about 70 to form the (C) polyurethane. In other embodiments, the isocyanate index is from about 15 to about 65, from about 20 to about 60, from about 25 to about 55, from about 30 to about 50, from about 35 to about 45, or from about 40 to about 45. In various embodiments, the isocyanate index is further defined as from about 25 to about 60, from about 25 to about 50, or from about 30 to about 45.

The (C) polyurethane gel may be further defined as totally reacted or cured. For example, an entire amount (e.g. 95, 96, 97, 98, 99, or 99+%) of (1) may react with an entire amount of (2), such that no additional substantive reaction occurs. Alternatively, the (C) polyurethane gel may be further described as a partial or non-complete reaction product of (1) and (2). In this scenario, there may be an excess of (1) and/or (2) present in the (C) polyurethane gel. It is contemplated that the (C) polyurethane gel, in this scenario, may be described as partially reacted or partially cured.

It is also contemplated that if the (C) polyurethane gel includes an excess of (1) and/or (2), then one or both of (1) and (2) may partially react with (A) and/or (B) during reaction and formation of the single layer flexible foam. In other words, if an excess of (1) and/or (2) is present in the (C) polyurethane gel, then, via reaction with (A) and/or (B), portions of the (C) polyurethane gel may be reacted into the single layer flexible foam, e.g. reacted into a urethane or urea matrix of the single layer flexible foam, possibly via cross-linking. Alternatively, even if an excess of (1) and/or (2) may exist in the (C) polyurethane foam, no incorporation or cross-linking may occur. In other words, even if there is an excess of (1) and/or (2), it is possible that no discernable reaction of (1) and/or (2) with (A) and/or (B) occurs.

The (C) polyurethane gel typically has a viscosity of from about 3,000 to about 12,000 cps at 25° C. as measured using a Brookfield Digital Viscometer with a #63 Spindle. Alternatively, (C) may have viscosity of from about 4,000 to about 11,000, from about 5,000 to about 10,000, of from about 6,000 to about 9,000, or of from about 7,000 to about 8,000, cps at 25° C. as measured using a Brookfield Digital Viscometer with a #63 Spindle. It is also contemplated that, in one embodiment, the polyurethane gel may be described as a viscous liquid having a viscosity of from about 3,000 to about 12,000 cps at 25° C. using a Brookfield Digital Viscometer with a #63 Spindle. Without intending to be limited by any particular theory, in one embodiment, the polyurethane gel may be further defined as a solid phase network suspended in a liquid modified to alter a physical state of an end (final) form. Alternatively, the polyurethane gel may be visually described as similar to a thick liquid, a sticky paste, a soft gummy form, or a tough rubbery material.

The (C) polyurethane gel may be present in the single layer flexible foam in any amount. However, in various embodiments, (C) is present in an amount of up to about 30, up to about 25, up to about 20, up to about 15, up to about 10, or up to about 5, parts by weight per 100 parts by weight of the single layer flexible foam. In other embodiments, the (C) polyurethane gel is present in the single layer flexible foam in amount of from about 0.01 to about 30, from about 1 to about 5, from about 5 to about 10, from about 5 to about 30, from about 8 to about 25, or from about 10 to about 20, parts by weight per 100 parts by weight of the single layer flexible foam. All values and ranges of values therebetween the aforementioned amounts are also expressly contemplated herein.

Figure 1:
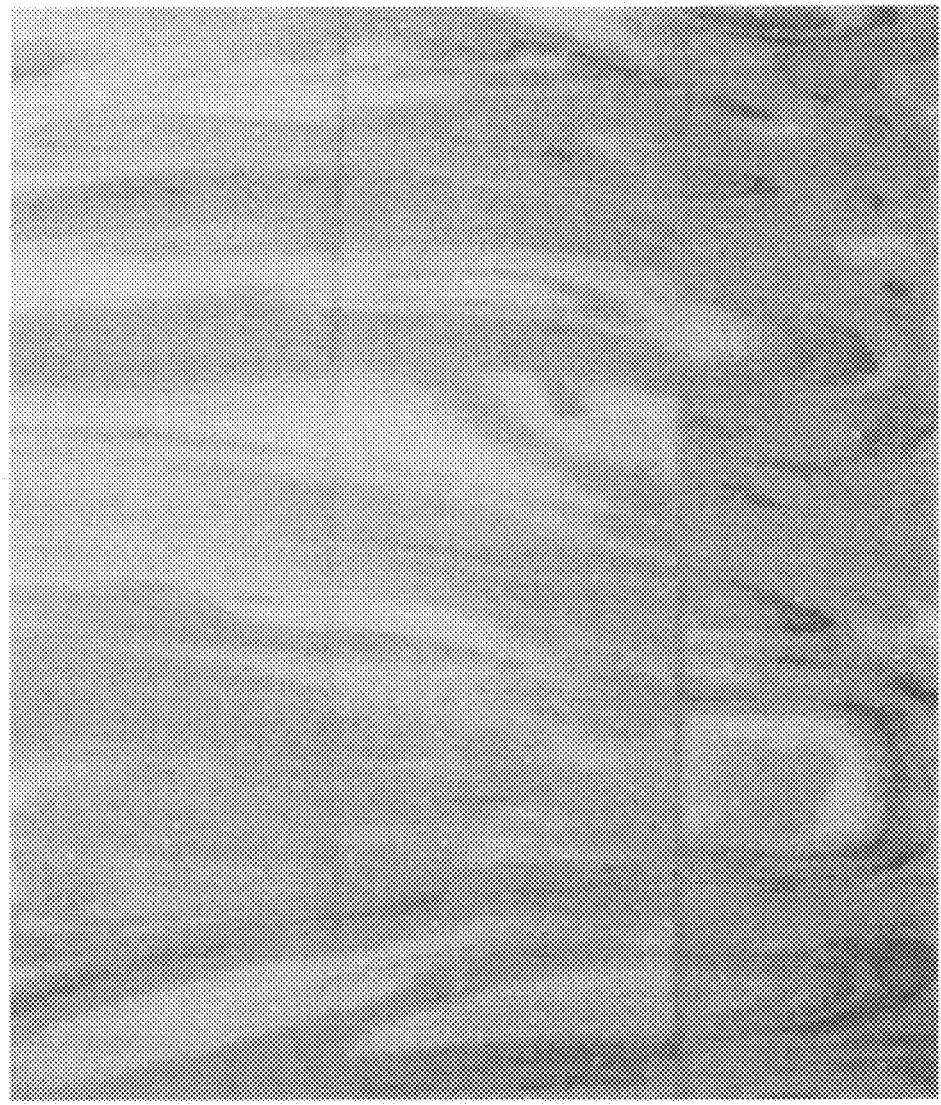
FIG. 1 is a color photograph of one embodiment of the single layer flexible foam wherein the plurality of agglomerated gel substrates (colored blue) is dispersed in the single layer flexible foam (colored white) in a non-uniform pattern.

Typically, the (C) polyurethane gel is not homogenously dispersed in the single layer flexible foam, although it may be. Said differently, the (C) polyurethane gel is typically dispersed heterogeneously in the single layer flexible foam. In one embodiment, the (C) polyurethane gel is differentiated from the single layer flexible foam. The single layer flexible foam typically includes a plurality of agglomerated gel substrates that are formed from the (C) polyurethane gel and that are dispersed in the single layer flexible foam. The terminology "gel substrates" typically describes a series of gel particles and/or collections of gel molecules. The terminology "agglomerated" typically describes that the gel substrates are disposed in collected groups and not randomly dispersed throughout the single layer flexible foam. It is contemplated that the (C) polyurethane gel and/or the gel substrates may be agglomerated together and the gel, gel substrates, and/or agglomerations may distributed in the single layer flexible foam in a swirl-shaped pattern. Alternatively, the (C) polyurethane gel, the gel substrates, and/or the agglomerations may be distributed in the single layer flexible foam in patterns that may be further described as non-uniform patterns, whorl-shaped patterns, ribbon-shaped patterns, marble patterns, spiral-shaped patterns, coil-shaped patterns, curl-shaped patterns, twisted patterns, looped patterns, helix patterns, serpentine patterns, sinusoidal patterns, winding patterns, and/or random patterns, and the like. It is alternatively contemplated that the (C) polyurethane gel, gel substrates, and/or agglomerations may be dispersed in the single layer flexible foam in geometric and/or symmetrical patterns, in gradient patterns, and/or in block patterns, and the like. In one embodiment, the (C) polyurethane gel, gel substrates, and/or agglomerations are disposed in certain regions of the single layer flexible foam and are absent from other regions of the single layer flexible foam. One non-limiting option of a suitable pattern is set forth in FIG. 1.

It is also contemplated that the single layer flexible foam may be free of more than one type of polyurethane gel substrates. In other words, the single layer flexible foam may include the aforementioned polyurethane gel substrates to the exclusion of other gel substrates.

Additives:

The single layer flexible foam and/or the (C) polyurethane gel may be formed in the presence of one or more additives or may be free of one of more additives. The one or more additives may be chosen from the group of chain extenders, recovery additives used to influence recovery of foams after compression, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, transition metals, catalysts, blowing agents, surfactants, cross-linkers, inert diluents, and combinations thereof. The one or more additives may be included in any amount as desired by those of skill in the art.

The one or more additives may include amines. The one or more additives may alternatively include surfactants to stabilize the resin composition. The surfactants may be anionic, cationic, or non-ionic surfactants or may include mixtures of one or more surfactants such as a single layer flexible foam surfactant that may be may be used to control cell size. Further, the one or more additives may include blowing agents and/or blowing catalysts. Further, the one or more additives may also include gelling catalysts. In another embodiment, the one or more additives includes a non-phthalate plasticizer.

In various embodiments, tin catalysts, amine catalysts, or combinations of such catalysts are utilized. It is also contemplated that an organometallic catalyst may be utilized e.g., tin, iron, lead, bismuth, mercury, titanium, hafnium, and/or zirconium, catalysts. Suitable non-limiting tin catalysts include tin(II) salts of organic carboxylic acids, e.g. tin(II) acetate, tin(II) octoate, tin(II) ethylhexanoate and tin(II) laurate. In one embodiment, the organometallic catalyst includes a dibutyltin dilaurate, which is a dialkyltin(IV) salt of an organic carboxylic acid. The organometallic catalyst can also include other dialkyltin(IV) salts of organic carboxylic acids, such as dibutyltin diacetate, dibutyltin maleate and dioctyltin diacetate.

Examples of other suitable but non-limiting catalysts include iron(II) chloride, zinc chloride, lead octoate, tris(dialkylaminoalkyl)-s-hexahydrotriazines such as, but not limited to, tris(N,N-dimethylaminopropyl)-s-hexahydrotriazine, tetraalkylammonium hydroxides such as, but not limited to, tetramethylammonium hydroxide, alkali metal hydroxides such as, but not limited to, sodium hydroxide and potassium hydroxide, alkali metal alkoxides such as, but not limited to, sodium methoxide and potassium isopropoxide, and alkali metal salts of long-chain fatty acids having from 10 to 20 carbon atoms and/or lateral OH functional groups. Additional suitable catalysts include trimerization catalysts such as N,N,N-dimethylaminopropylhexahydrotriazine, potassium, potassium acetate, N,N,N-trimethyl isopropyl amine/formate, and combinations thereof. Even further examples of suitable catalysts include tertiary amine catalysts such as dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethyl aminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino)propylimidazole, and combinations thereof.

In various embodiments, the additive includes a colorant, such as a reactint, pigment, and/or dye. The colorant may be utilized in liquid or powdered form. The colorant can be of any color, such as white, black, red, green, blue, yellow, green, brown, etc. Various blends of colorants may be utilized to impart different colors, strengths of color, and shades to single layer flexible foam and/or (C) polyurethane gel.

Method of Forming the Single Layer Flexible Foam:

This disclosure also provides a method of forming the single layer flexible foam. The method may include, consist essentially of, or consist of, the steps of providing the (A) isocyanate component, providing the (B) isocyanate-reactive component, providing the (C) polyurethane gel, and combining the (C) polyurethane gel with (A) and (B) such that (A) and (B) react in the presence of (C) to form the single layer flexible foam. The steps of providing (A), (B), and/or (C) are not particularly limited. One or more may be provided via spraying, pouring, and the like. Similarly, (A), (B), and (C) can be combined using any method known in the art. In one embodiment, (C) is added via one or more pumps to a (A) or (B), or a mixture of (A) and (B), in a reactor. In other embodiments, (A), (B), and/or (C) are provided and/or combined using a total mix technique, a wave technique, a marble/swirl technique, and/or a pour in place technique. The method may include only the steps described above or may include one or more additional steps, as chosen by one of skill in the art.

EXAMPLES

A series of single layer flexible foams ((Inventive) Foams 1-5) are formed according to this disclosure and include the polyurethane gel of this disclosure. Two comparative single layer flexible foams (Comparative Foams 1 and 2) are also formed but do not include the polyurethane gel of this disclosure. More specifically, each of the Foams 1-5 and the Comparative Foams 1 and 2 are formed using the components set forth in Table 1 below, wherein all values are approximate parts by weight unless otherwise specified.

TABLE 1

|  | Foam 1 | Foam 2 | Comp. Foam 1 | Foam 3 | Foam 4 | Foam 5 | Comp. Foam 2 |
|---|---|---|---|---|---|---|---|
| Polyol 1 | 5 | 5 | 5 | — | — | — | — |
| Polyol 2 | 10 | 10 | 10 | — | — | — | — |
| Polyol 3 | 85 | 85 | 85 | — | — | — | — |

TABLE 1-continued

|  | Foam 1 | Foam 2 | Comp. Foam 1 | Foam 3 | Foam 4 | Foam 5 | Comp. Foam 2 |
|---|---|---|---|---|---|---|---|
| Polyol 4 | — | — | — | 20 | 20 | 40 | 20 |
| Polyol 5 | — | — | — | 80 | 80 | 60 | 80 |
| Water | 1.22 | 1.22 | 1.22 | 2.02 | 2.07 | 1.97 | 1.97 |
| Surfactant 1 | 2 | 2 | 2 | — | — | — | — |
| Surfactant 2 | — | — | — | 1.5 | 1.5 | 1.5 | 1.5 |
| Chain Extender | — | — | — | 2 | 2 | 2 | 2 |
| Recovery Monol Additive | 2 | 2 | 2 | — | — | — | — |
| Catalyst 1 | 0.5 | 0.5 | 0.5 | 0.15 | 0.15 | 0.16 | 0.15 |
| Catalyst 2 | 0.6 | 0.6 | 0.6 | 0.05 | 0.05 | 0.04 | 0.05 |
| Catalyst 3 | — | — | — | 0.06 | 0.06 | 0.05 | 0.06 |
| Polyurethane Gel | 5 | 10 | 0 | 5 | 10 | 7 | 0 |
| Isocyanate 1 | 34.8 | 34.8 | 34.8 | — | — | — | — |
| Isocyanate 2 | — | — | — | 27.65 | 28.41 | 27.81 | 26.90 |
| Isocyanate Index | 90 | 90 | 90 | 97 | 98 | 100 | 96 |

Polyol 1 is Pluracol ® 2100 commercially available from BASF Corporation.
Polyol 2 is Pluracol ® 3424 commercially available from BASF Corporation.
Polyol 3 is Pluracol ® 593 commercially available from BASF Corporation.
Polyol 4 is Pluracol ® 5132 commercially available from BASF Corporation.
Polyol 5 is Pluracol ® 1603 commercially available from BASF Corporation.
Surfactant 1 is Tegostab ® B8418 commercially available from Evonik Industries.
Surfactant 2 is Tegostab ® B8707 commercially available from Evonik Industries.
Chain Extender is DABCO ® DEOA-LF--diethanolamine/water (85/15) commercially available from Air Products and Chemicals, Inc.
Recovery Monol Additive is benzyl alcohol.
Catalyst 1 is DABCO ® 33 LV commercially available from Air Products and Chemicals, Inc.
Catalyst 2 is DABCO ® BL11 commercially available from Air Products and Chemicals, Inc.
Catalyst 3 is DABCO ® T-12 commercially available from Air Products and Chemicals, Inc.
Isocyanate 1 is Lupranate ® 280 commercially available from BASF Corporation.
Isocyanate 2 is Lupranate ® T-80 TDI commercially available from BASF Corporation.

The Polyurethane Gel used in formation of the Foams 1-5 is formed using the following components wherein all values are in parts by weight.

|  | Polyurethane Gel |
|---|---|
| Pluracol ® 4156 | 100.0 |
| Lupranate ® 280 | 5.1 (Isocyanate Index = 40) |
| Colorant | 1.0 |
| T-9 | 0.03 |
| GBL | 30.0 |

Colorant is Reactint Blue X8515 commercially available from Milliken Chemical.
T-9 is DABCO ® T-9 stannous octoate catalyst commercially available from Air Products and Chemicals, Inc..
GBL is Gamma Butyrolactone commercially available from BASF Corporation.

After formation, various samples of the aforementioned Foams are evaluated to determine a range of physical properties, fatigue properties, and flammability properties, using standard ASTM D3574 methods, as set forth in Table 2 below.

TABLE 2

|  | Foam 1 | Foam 2 | Comp. Foam 1 |
|---|---|---|---|
| Physical Properties |  |  |  |
| Density, pcf | 4.4 | 4.6 | 4.3 |
| Elongation, % | 57 | 60 | 52 |
| Tensile, psi | 4 | 4 | 3 |
| Tear, pi | 0.7 | 0.6 | 0.6 |
| Resilience, % | 19 | 15 | 15 |
| IFD, lb./50 sq. in. (4 in.) |  |  |  |
| 25% | 17 | 17 | 15 |
| 65% | 38 | 39 | 33 |
| 25% Return | 16 | 16 | 13 |
| Support Factor | 2.21 | 2.25 | 2.25 |
| Recovery, % | 92 | 91 | 91 |
| Compression Sets, % set |  |  |  |
| 50% | 1 | 0 | 3 |
| 50%* | 0 | 1 | 2 |
| 90% | 3 | 3 | 6 |
| 90%* | 6 | 6 | 16 |
| CFD, % Of Original 50% |  |  |  |
| Humid Aged** | 85 | 87 | 86 |
| Air Flow, cfm (crushed) | 0.3 | 0.3 | 0.4 |
| Recovery Time, sec. | 1 | 1 | 1 |
| DMA - Tg, C. | −18 | −16 | −19 |
| DMA - Tan Delta | 1.07 | 1.08 | 1.14 |
| Cell Size, um | 538 | 528 | 555 |
| Cell count, #cells/inch | 67 | 67 | 62 |
| Fatigue Properties |  |  |  |
| Static Fatigue |  |  |  |
| Height, % Loss | 0.4 | 0.5 | 0.2 |
| IFD, 25% Loss | 2.0 | 2.2 | 2.5 |
| IFD, 65% Loss | 1.7 | 2.2 | 2.1 |
| Pounding, 80k cycles |  |  |  |
| Height, % Loss | 0.9 | 0.2 | 1.0 |
| 40% IFD, % Loss | 9.1 | 4.0 | 7.9 |

|  | Foam 3 | Foam 4 | Foam 5 | Comp. Foam 2 |
|---|---|---|---|---|
| Physical Properties |  |  |  |  |
| Density, pcf | 3.0 | 3.0 | 3.1 | 2.9 |
| Elongation, % | 129 | 125 | 131 | 143 |
| Tensile, psi | 12 | 11 | 16 | 12 |
| HTAG Elongation, % | 130 | 124 | — | 133 |
| HTAG Tensile, psi | 12 | 12 | — | 10 |
| Tear, pi | 1.4 | 1.4 | 1.8 | 1.5 |
| Resilience, % | 59 | 55 | 58 | 58 |
| IFD, lb./50 sq. in. (4 in.) |  |  |  |  |
| 25% | 16 | 17 | 24 | 15 |
| 65% | 42 | 43 | 64 | 38 |
| 25% Return | 14 | 14 | 21 | 12 |
| Support Factor | 2.57 | 2.56 | 2.63 | 2.62 |
| Recovery, % | 86 | 87 | 86 | 86 |
| Compression Sets, % set |  |  |  |  |
| 50% | 7 | 8 | 5 | 8 |
| 50%* | 6 | 6 | 4 | 6 |
| CFD, % Of Original 50% |  |  |  |  |
| Humid Aged* | 98 | 95 | 102 | 92 |
| Air Flow, cfm (crushed) | 1.4 | 1.2 | 1.1 | 2.1 |
| Fatigue Properties |  |  |  |  |
| Static Fatigue |  |  |  |  |
| Height, % Loss | 3 | 2 | 2 | 4 |
| IFD, 25% Loss | 25 | 22 | 23 | 31 |
| IFD, 65% Loss | 21 | 20 | 21 | 26 |
| Pounding, 80k cycles |  |  |  |  |
| Height, % Loss | 1 | 1 | 1 | 2 |
| 40% IFD, % Loss | 13 | 14 | 9 | 17 |
| Flammability Properties |  |  |  |  |
| Cal. T.B. 117 Vertical Open Flame |  |  |  |  |
| Afterflame, Sec. (avg.) | 0.0 | 0.0 | 5 | 0.0 |
| Char Length, In. (avg.) | 1.9 | 1.6 | 4 | 2.0 |
| Afterflame, Sec. (avg.) HT | 1.7 | 0.0 | 3 | 0.0 |
| Char Length, In. (avg.) HT | 1.4 | 1.3 | 2.8 | 1.2 |
| Cal. T.B. 117 Smoldering |  |  |  |  |
| % Wt. Retained (min. 80.0%) | 98.7 | 98.9 | 99.4 | 98.4 |

*Humid Aged 3 hrs at 220° F.

The data set forth above demonstrates that the polyurethane gel of this disclosure does not degrade the properties of otherwise acceptable flexible foams, i.e., the Comparative Foams 1 and 2. In fact, the Foams of this disclosure exhibit improved (i.e., lower) compression sets than the Comparative Foams.

Pressure Mapping:

Foams 2, 4, and 5 of this disclosure and Comparative Foams 1 and 2 are also evaluated using pressure mapping techniques to determine whether the Foams of this disclosure reduce the presence of pressure points when subjected to various loads exerted downwards.

More specifically, a top layer of viscoelastic memory foam is disposed on a bottom layer of high resilience foam. Both the top and bottom layers of foam have dimensions of 2"×18×20". After assembly, the top and bottom layers of foam are placed in a Swick or Instron IFD tester and subjected to varying loads of 200, 400, and 600 Newtons. The Swick or Instron IFD tester exerts a downward force on the Foams through use of a metal plate configured in a shape that mimics a human form in a sitting position. Pressure maps are generated from the Swick or Instron IFD tester and are color coded as set forth in FIG. 2 wherein pressures of from about zero to between about 5.1 and 5.9 are those that most consumers are comfortable with while pressures of greater than about 5.9 are those that most consumers find uncomfortable.

Figure 2:
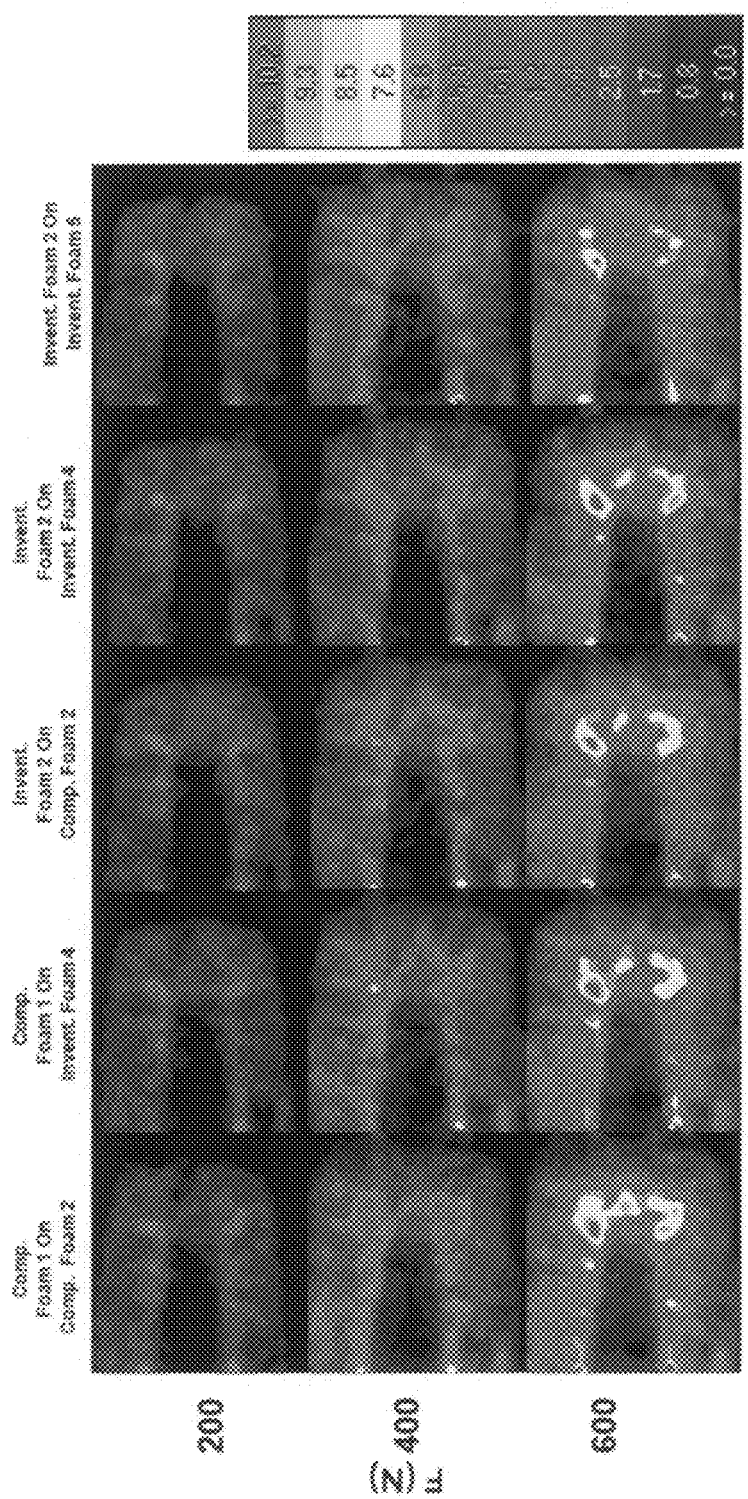
FIG. 2 includes a series of color pressure maps, and a corresponding legend, that are representative of the pressure maps described in the Examples.

In FIG. 2, from left to right, the top layer and bottom layer are as follows:

Comparative Foam 1 (Top) disposed on Comparative Foam 2 (Bottom);
Comparative Foam 1 (Top) disposed on Inventive Foam 4 (Bottom);
Inventive Foam 2 (Top) disposed on Comparative Foam 2 (Bottom);
Inventive Foam 2 (Top) disposed on Inventive Foam 4 (Bottom); and
Inventive Foam 2 (Top) disposed on Inventive Foam 5 (Bottom)

These pressure maps generated via testing the aforementioned foams generally indicate a 5-25% reduction in the presence and intensity of pressure points determined using a formula and specific data points generated in the pressure maps.

Figure 4:
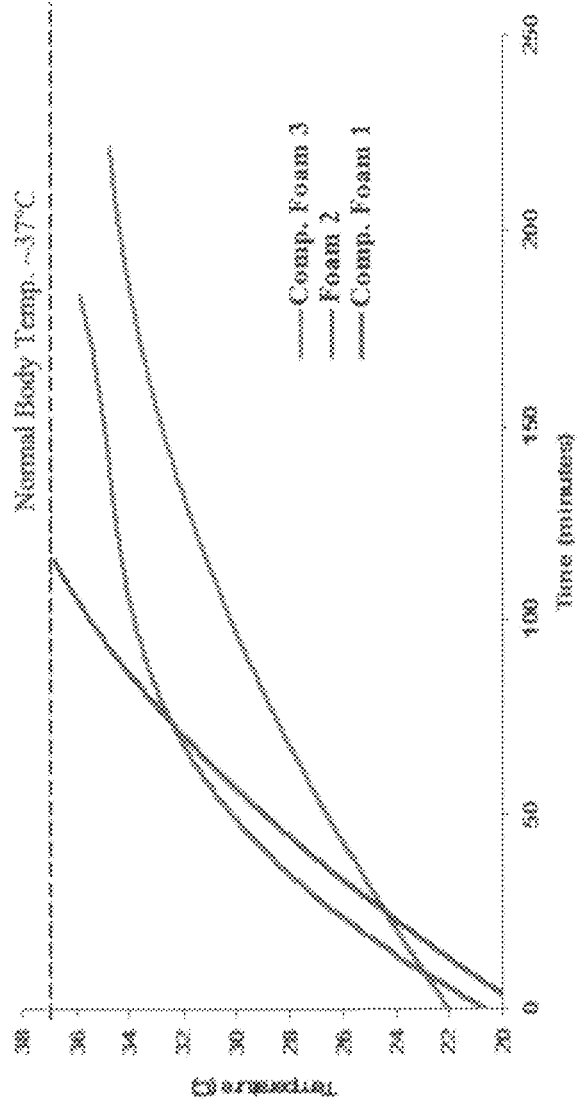
FIG. 4 is a line graph that is representative of the data described in the Examples associated with the rise in temperature of Foam 2, Comparative Foam 1, and Comparative Foam 3, as a function of time.

Evaluation of Temperature Rise as a Function of Time:

Additional samples of Foams are also generated and evaluated to determine temperature rise as a function of time. These evaluations are designed to mimic the ability of the foams to remain cool when touched. Without intending to be bound by any particular theory, it is believed that foams that wick away heat and/or require longer times to rise in temperature (as compared to other foams) feel cooler to the touch. Three samples of foams are evaluated to determine temperature rise as a function of time. A sample of Foam 2 is evaluated and compared with a sample of Comparative Foam 1 (with no polyurethane gel) and a sample of Comparative Foam 3. Comparative Foam 3 is formed by embedding a sample of the polyurethane gel used to form Foam 2 into a sample of Comparative Foam 1. More specifically, to form Comparative Foam 3, a section of the top of an additional sample of Comparative Foam 1 is cut out and filled with a sample of the polyurethane gel used to form Foam 2. Accordingly, Comparative Foam 3 is the same as Comparative Foam 1 but for the embedding of one embodiment of the polyurethane gel of this disclosure. After formation, each of the samples is exposed to heat up and/or exceeding body temperature (~37° C.). The temperatures of the samples themselves are then measured over time while the samples are exposed to the heat and the results are plotted in FIG. 4. The results of FIG. 4 suggest that Foam 2 of this disclosure out-performs Comparative Foam 1 because the rise in temperature over time is less severe for Foam 2. The results also suggest that Foam 2 performs similarly to Comparative Foam 3 especially as time increases. However, and as described above, the foams of this disclosure (e.g. Foam 2) are typically formed in more time and cost efficient manners than comparative foams (e.g. Comparative Foams 1 and 3).

It is to be understood that one or more of the values described above may vary by ±5%, ±10%, ±15%, ±20%, ±25%, ±30%, etc. so long as the variance remains within the scope of the disclosure. It is also to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The subject matter of all combinations of independent and dependent claims, both singly and multiply dependent, is herein expressly contemplated but is not described in detail for the sake of brevity. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A single layer flexible foam comprising the reaction product of:
   A. an isocyanate component; and
   B. an isocyanate-reactive component; reacted in the presence of
   C. a polyurethane gel having a viscosity of from about 3,000 to about 12,000 cps at 25° C. and comprising the reaction product of;
      (1) a polyol component, and
      (2) a second isocyanate component, at an isocyanate index of from about 10 to about 70,
   wherein said single layer flexible foam comprises a plurality of agglomerated gel substrates that are formed from said polyurethane gel and that are heterogeneously dispersed in said single layer flexible foam.

2. A single layer flexible foam as set forth in claim 1 wherein said (B) isocyanate-reactive component comprises a polyol such that said single layer flexible foam is further defined as a single layer polyurethane flexible foam.

3. A single layer flexible foam as set forth in claim 2 that is further defined as a slabstock viscoelastic memory single layer polyurethane flexible foam.

4. A single layer flexible foam as set forth in claim 2 that is further defined as a high resilience single layer polyurethane flexible foam.

5. A single layer flexible foam as set forth in claim 2 wherein said polyurethane gel is present in an amount of up to about 30 parts by weight per 100 parts by weight of said single layer polyurethane flexible foam.

6. A single layer flexible foam as set forth in claim 5 wherein said plurality of agglomerated gel substrates is heterogeneously dispersed in said single layer polyurethane flexible foam in a non-uniform pattern.

7. A single layer flexible foam as set forth in claim 6 wherein said non-uniform pattern is further defined as a swirl pattern.

8. A single layer flexible foam as set forth in claim 1 wherein said polyol component comprises a triol.

9. A single layer flexible foam as set forth in claim 8 wherein said triol has a hydroxyl number of from about 20 to about 200 mg KOH/g.

10. A single layer flexible foam as set forth in claim 9 wherein said triol is formed in the presence of a double metal cyanide catalyst.

11. A single layer flexible foam as set forth in claim 2 wherein said polyurethane gel is present in an amount of from about 5 to 15 parts by weight per 100 parts by weight of said single layer polyurethane flexible foam and wherein said single layer polyurethane flexible foam has a glass transition temperature of less than 30° C.

12. A single layer flexible foam as set forth in claim 1 wherein said (B) isocyanate-reactive component is further defined as a triol formed in the presence of a double metal cyanide catalyst such that said single layer flexible foam is further defined as a single layer polyurethane flexible foam, wherein said plurality of agglomerated gel substrates is heterogeneously dispersed in said single layer polyurethane flexible foam in a non-uniform pattern, wherein said polyurethane gel is present in an amount of from about 5 to 15 parts by weight per 100 parts by weight of said single layer polyurethane flexible foam, and wherein said single layer polyurethane flexible foam has a glass transition temperature of less than 30° C.

13. A method of forming a single layer flexible foam, said method comprising the steps of:
   (I) providing an (A) isocyanate component;
   (II) providing an (B) isocyanate-reactive component;
   (III) providing a (C) polyurethane gel; and
   (IV) combining the (C) polyurethane gel with (A) and (B) such that (A) and (B) react in the presence of (C) to form the flexible foam,
   wherein the (C) polyurethane gel has a viscosity of from about 3,000 to about 12,000 cps at 25° C. and comprises the reaction product of (1) a polyol component and (2) a second isocyanate component at an isocyanate index of from about 10 to about 70, and
   wherein the single layer flexible foam comprises a plurality of agglomerated gel substrates formed from the polyurethane gel and heterogeneously dispersed in the single layer flexible foam.

14. A method as set forth in claim 13 wherein the (B) isocyanate-reactive component comprises a polyol such that the single layer flexible foam is further defined as a single layer polyurethane flexible foam.

15. A method as set forth in claim 14 wherein the polyurethane gel is present in an amount of up to about 30 parts by weight per 100 parts by weight of the single layer polyurethane flexible foam.

16. A method as set forth in claim 13 wherein the polyol component comprises a triol.

17. A method as set forth in claim 16 wherein the triol has a hydroxyl number of from about 20 to about 200 mg KOH/g.

18. A method as set forth in claim 17 wherein the triol is formed in the presence of a double metal cyanide catalyst.

19. A method as set forth in any claim 14 wherein the polyurethane gel is present in an amount of from about 5 to 15 parts by weight per 100 parts by weight of the single layer polyurethane flexible foam and wherein the single layer polyurethane flexible foam has a glass transition temperature of less than 30° C.

20. A method as set forth in claim 13 wherein the (B) isocyanate-reactive component is further defined as a triol formed in the presence of a double metal cyanide catalyst such that the single layer flexible foam is further defined as a single layer polyurethane flexible foam, wherein the plurality of agglomerated gel substrates is heterogeneously dispersed in the single layer polyurethane flexible foam in a non-uniform pattern, wherein the polyurethane gel is present in an amount of from about 5 to 15 parts by weight per 100 parts by weight of the single layer polyurethane flexible foam, and wherein the single layer polyurethane flexible foam has a glass transition temperature of less than 30° C.

21. A single layer flexible foam as set forth in claim 1 wherein the reaction product of the (1) polyol component and the (2) second isocyanate component comprises a stoichiometric excess of the (1) polyol component.

22. A method as set forth in claim 13 wherein the reaction product of the (1) polyol component and the (2) second isocyanate component comprises a stoichiometric excess of the (1) polyol component.

* * * * *